May 4, 1954  P. M. G. HECKERMAN  2,677,349
BROODER, INCLUDING DIRT AND DRAFT-FREE FLOOR
Filed Jan. 30, 1953  4 Sheets-Sheet 1
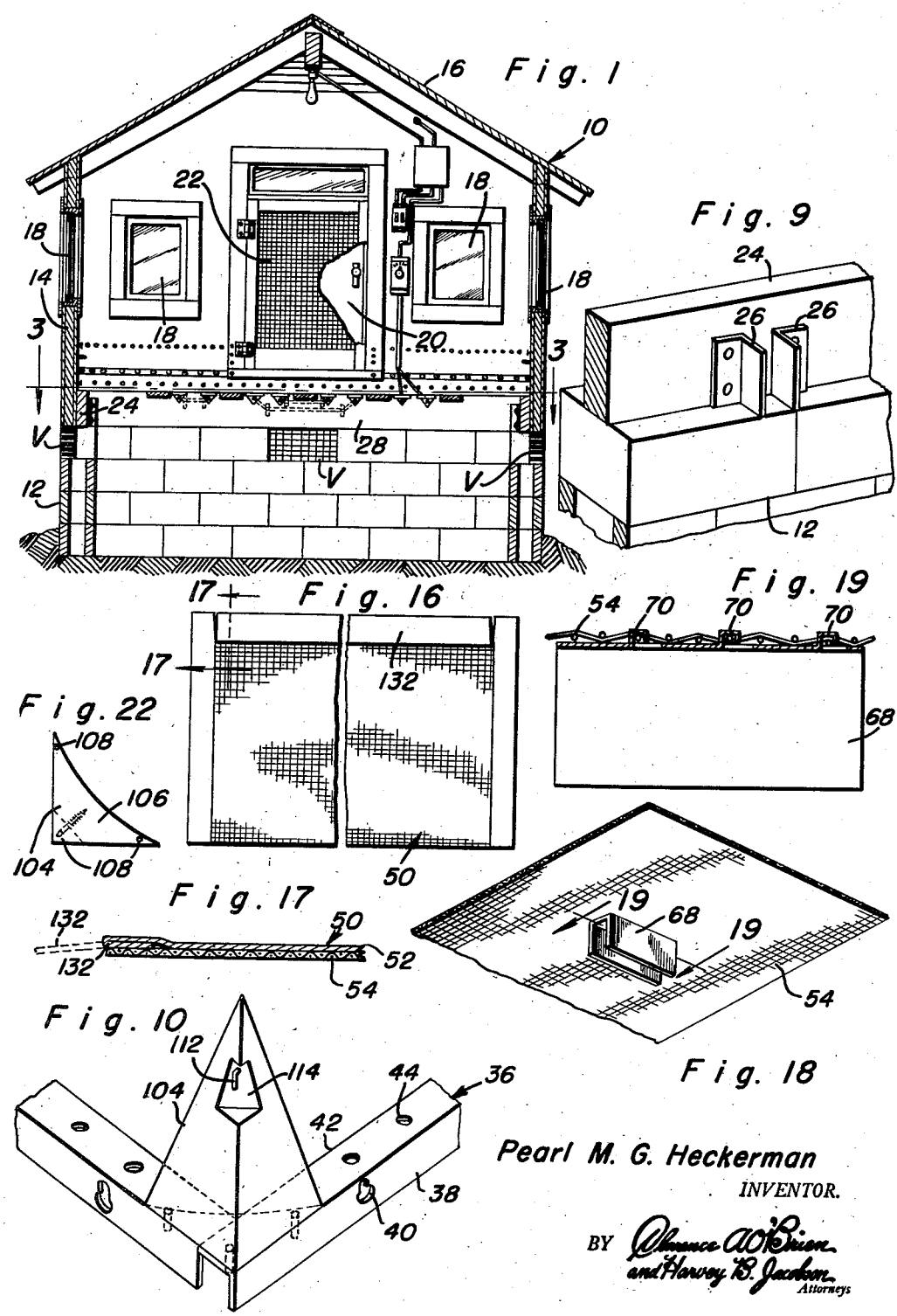
Pearl M. G. Heckerman
INVENTOR.

May 4, 1954 P. M. G. HECKERMAN 2,677,349
BROODER, INCLUDING DIRT AND DRAFT-FREE FLOOR
Filed Jan. 30, 1953 4 Sheets-Sheet 2
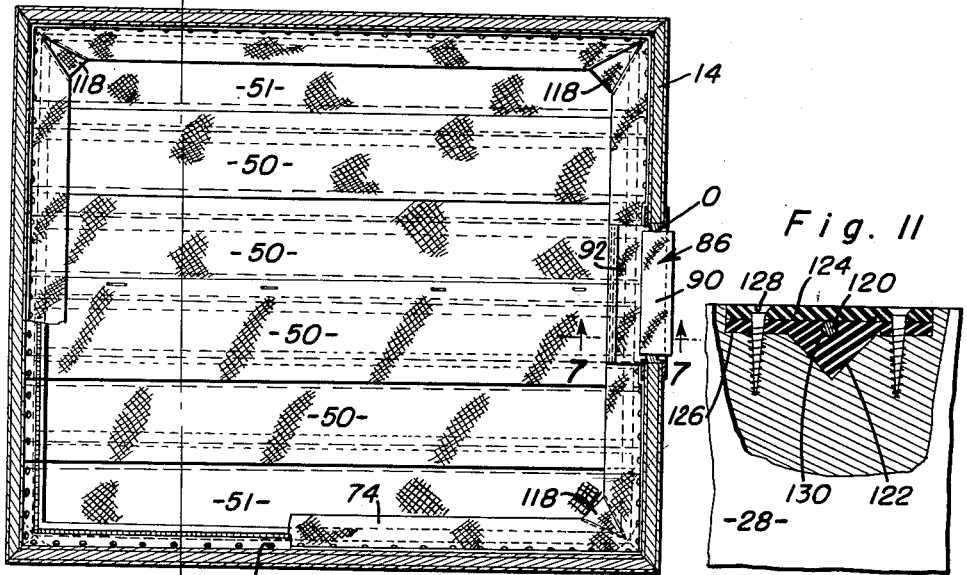
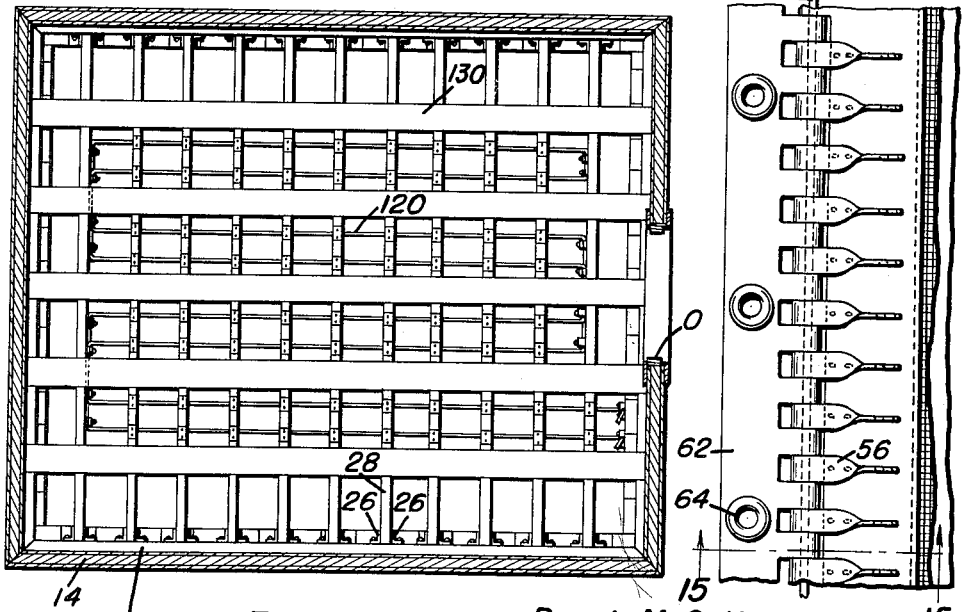
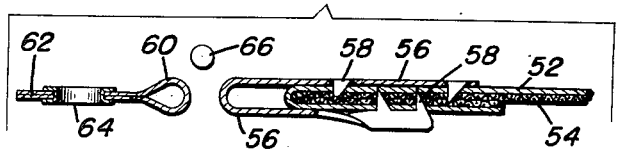
Pearl M. G. Heckerman
INVENTOR.
BY *Clarence A. O'Brien*
and *Harvey B. Jacobson*
Attorneys May 4, 1954   P. M. G. HECKERMAN   2,677,349
BROODER, INCLUDING DIRT AND DRAFT-FREE FLOOR
Filed Jan. 30, 1953   4 Sheets-Sheet 3
Fig. 12
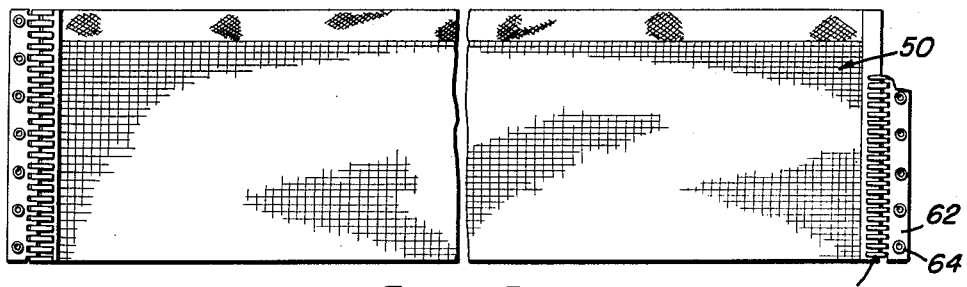
Fig. 13
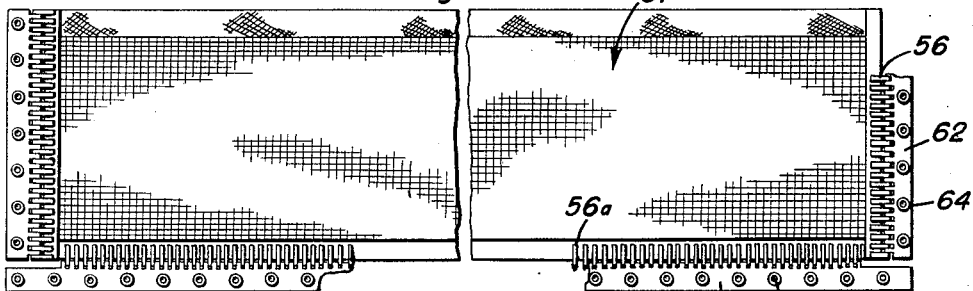
Fig. 4
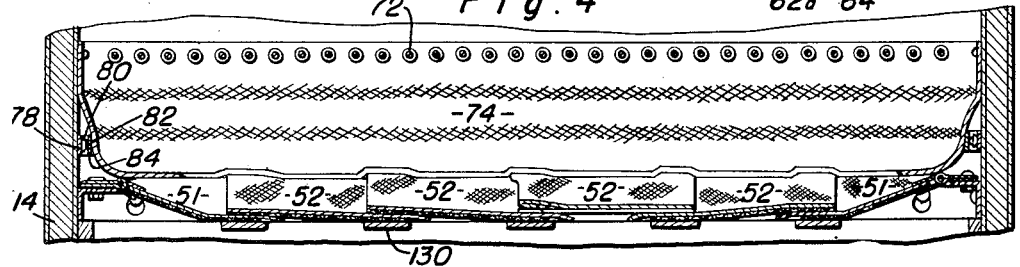
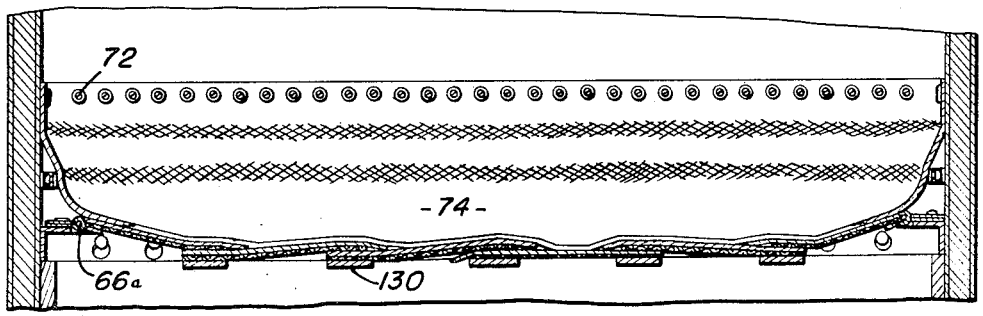
Fig. 5
Pearl M. G. Heckerman
INVENTOR.
BY Clarence A. O'Brien
and Harvey B. Jacobson
Attorneys

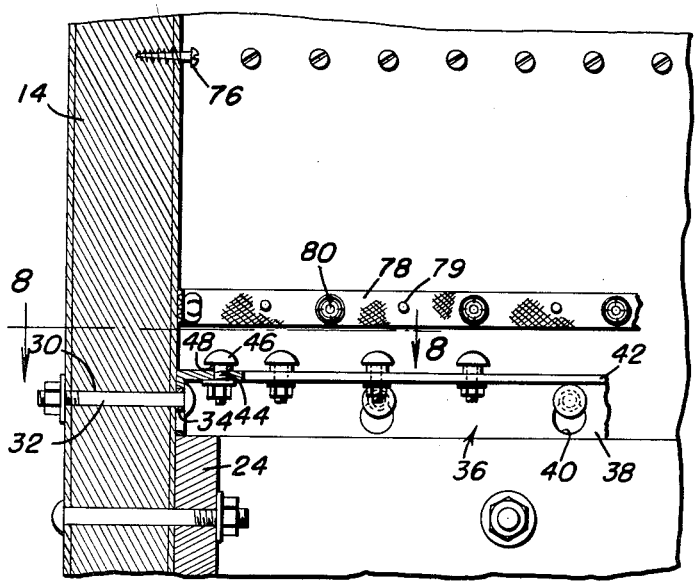
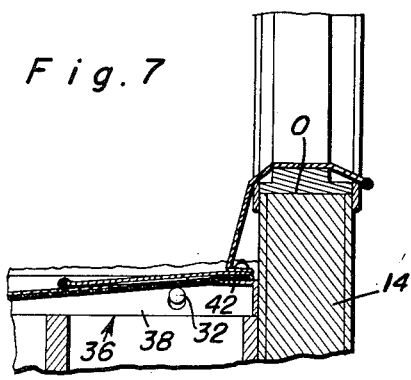
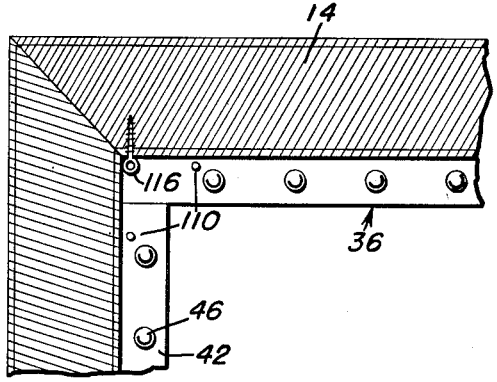
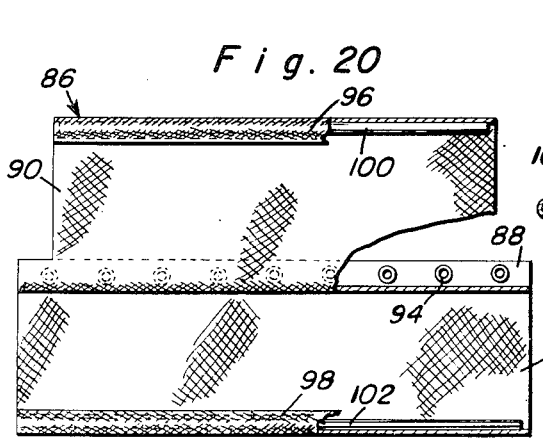
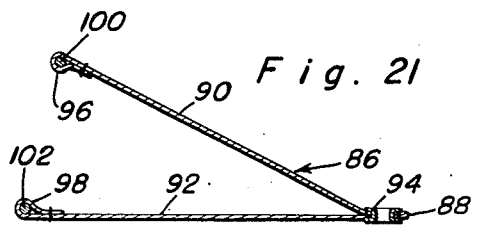
Pearl M. G. Heckerman
INVENTOR.

Patented May 4, 1954

2,677,349

UNITED STATES PATENT OFFICE 2,677,349

BROODER, INCLUDING DIRT AND DRAFT-FREE FLOOR

Pearl M. G. Heckerman, Jefferson City, Mo.

Application January 30, 1953, Serial No. 334,240

10 Claims. (Cl. 119—31)

This invention relates to new and useful improvements in brooders for chicks, ducks, geese and the like and the primary object of the present invention is to provide a brooder including a novel and improved floor structure whereby the floor will be free of litter which frequently causes the breeding of diseases.

Another important object of the present invention is to provide a brooder having a removable floor structure composed of a plurality of flexible strips arranged in side by side relation with adjacent strips having overlapping longitudinal edges between which a litter will be worked to drop into a pit under the floor as chicks move about upon the strips.

A further object of the present invention is to provide a brooder of the aforementioned character including a draft preventing apron that is removably secured to the brooder house above the floor and which has a lower marginal edge folded upon the floor to prevent draft from harmfully affecting chicks, ducks, geese and the like on the floor.

A still further aim of the present invention is to provide a brooder including dirt and draft-free floor construction, which brooder is extremely simple and practical in construction, strong and reliable in use, efficient and durable in operation, inexpensive to manufacture, maintain and service, and otherwise well adapted for the purposes for which the same is intended.

These and other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a transverse vertical sectional view of the present invention, the strip-supporting frame and draft preventing apron being removed;

Figure 2 is a horizontal sectional view of Figure 1 on an enlarged scale and showing the flooring and drafting preventing apron installed;

Figure 3 is an enlarged horizontal sectional view taken substantially on the plane of section line 3—3 of Figure 1;

Figure 4 is an enlarged transverse vertical sectional view taken substantially on the plane of section line 4—4 of Figure 2;

Figure 5 is a view similar to Figure 4 but showing the flooring strips arranged to retain litter;

Figure 6 is an enlarged fragmentary view of Figure 1 showing the manner in which the strip-holding frame is secured to the peripheral wall of the brooder;

Figure 7 is an enlarged detail vertical sectional view taken substantially on the plane of section line 7—7 of Figure 2;

Figure 8 is a horizontal sectional view of Figure 6 taken substantially on the plane of section line 8—8;

Figure 9 is an enlarged fragmentary perspective view showing the joist retaining brackets;

Figure 10 is an enlarged fragmentary perspective view of one corner of the strip-supporting frame and showing a corner member secured thereto;

Figure 11 is an enlarged fragmentary view of Figure 1 showing the manner in which the heating coil is secured to the joists;

Figure 12 is an enlarged fragmentary plan view of one of the intermediate flooring strips;

Figure 13 is an enlarged fragmentary plan view of one of the outer flooring strips;

Figure 14 is an enlarged fragmentary plan view showing the manner in which the attaching strips are hingedly secured to the flooring strips;

Figure 15 is an enlarged sectional view taken substantially on the plane of section line 15—15 of Figure 14 and showing the attaching strip spaced from the flooring strip;

Figure 16 is an enlarged fragmentary plan view of one of the flooring strips and showing its litter retaining flap folded back;

Figure 17 is an enlarged detail sectional view taken substantially on the plane of section line 17—17 of Figure 16;

Figure 18 is a fragmentary perspective view of one of the flooring strips and showing the retaining clips secured thereto;

Figure 19 is an enlarged vertical sectional view taken substantially on the plane of section line 19—19 of Figure 8;

Figure 20 is a fragmentary plan view, with parts broken away, of the draft-preventing flap used in the invention;

Figure 21 is a transverse vertical sectional view, in slightly enlarged scale, of Figure 20 and showing the flap sections folded one upon the other; and Figure 22 is a bottom plan view of one of the corner members used in the present invention.

Referring now to the drawings in detail, wherein for the purpose of illustration, there is disclosed a preferred embodiment of the present invention, the numeral 10 represents the brooder generally, including a pit-forming substantially rectangular base 12 constructed of preferably eight-inch wide construction blocks. The upper rows of blocks forming the base 12 support a brooder house having a rectangular peripheral wall 14 and a roof 16. The sides and ends of the peripheral wall 14 are provided with openings in which windows 18 are mounted and the forward end of the peripheral wall 14 is provided with an entrance opening in which there is disposed a solid outside door 20 and a screen door 22 both of these doors being hinged to the forward end of the wall 14.

The lower end portion of the peripheral wall 14 is reinforced by side beams 24 that rest upon the upper rows of blocks forming the base 12. The side beams 24 are offset from the inner faces of these blocks as shown in Figures 1 and 9. Pairs of back to back angle brackets 26 are secured to the inner faces of the beams 24 and receive therebetween the ends of removable joists 28.

Horizontally extending bores 30 are provided in the sides and ends of the peripheral wall 14 above the beams 24. Headed bolts 32 extend through these apertures or bores and their heads are spaced inwardly of the wall 14 by spacer rings 34. The bolts 32 removably support an open substantially rectangular angle iron frame 36 composed of four separate angle iron rails that are arranged to form a continuous vertical flange 38 that is provided with key slots 40. The slots 40 accommodate the heads of fasteners 32 and permit the frame 36 to be engaged against the sides and ends of the peripheral wall 14 as shown in Figure 6 and resting upon the upper edges of the joists 28.

The horizontal flange 42 of frame 36 is provided with a plurality of spaced apertures 44 that receive headed fasteners (bolts) 46 whose heads are spaced above the horizontal flange 42 by spacer rings 48, whereby a plurality of flooring strips 50, 51 may be removably secured over the heads of the fasteners 46 in a manner now to be described.

Each of the strips 50, 51 is composed of two juxtapositioned layers or sheets 52 and 54. The layers 52 are of rot-resistant canvas and the layers 54 are of wire mesh. The layers 52 and 54 are suitably secured together by stitching or the like, with the layers 54 underlying the layers 52, as shown in Figure 15. Channel-shaped hinge strips or clips 56 are anchored by outwardly struck or bent tabs 58 to the ends of the flooring strips 50, 51. The strips 56 are spaced apart to accommodate the spaced knuckles 60 of apertured attaching strips 62 having grommets 64 secured in their apertures which are engaged over the heads of the fasteners 64 disposed on the ends of the frame 36. Pins 66 extend through the knuckles 60 and strips 62 to hingedly and removably secure the attaching strips to the flooring strips.

Six of the strips 50, 51 are used to cover the opening in frame 36. The strips referred to by the numeral 51 comprise the outer two strips and have outer longitudinal edges that support longitudinally spaced U-shaped clips 56a similar to clips 56. The clips 56a are spaced apart to be interdigitated with the spaced knuckles of apertured attaching and hinging strips 62a. The knuckles of strips 62a are connected to the clips 56a by hinge pins 66a and have longitudinally spaced apertures in which grommets 64a are secured. The grommets 64a are engaged over the heads of the fasteners 44 extending upwardly from the longitudinal sides of the frame 36.

Each of the flooring strips 50, 51 removably support a plurality of longitudinally spaced channel-shaped brackets or clips 68. Anchoring tongues 70 are struck from the web portions of these brackets and are secured to the layers 54 of strips 50, 51, as shown in Figure 19, to retain the brackets 68 on the undersides of the flooring strips. Brackets 68 engage over the joists 28 to restrict relative movement between the strips 50, 51 when they are secured to the frame 36.

Spaced grommets 72 are secured adjacent the upper marginal edge of a canvas draft-preventing apron 74. These grommets 72, accommodate headed fasteners (screws) 76 which are extended into the peripheral wall 14 above the fasteners 32, as shown in Figure 6. A snap fastener holding strip 78 is secured by nails or the like 79 to the inner surface of peripheral wall 14 and holds female snap fasteners 80 that are releasably engaged with male snap fasteners 82 on a holding strip 84 secured to the apron 74 (see Figures 4 and 5). The lower marginal edge of the apron 74 is folded upon the strips 50, 51 to extend inwardly from the vertical flange 38 of the frame 36.

Apron 74 does not extend completely about the frame 36 as the door frame opening O prevents the application of the apron holding fasteners at this portion of wall 14. However, a draft-preventing flap 86 (Figures 20, 21) is provided for closing the space between the ends of the apron 74 which terminate adjacent the opening O. Flap 86 is composed of a canvas sheet which is folded, as at 88, to form two sections 90 and 92. Grommets 94 are secured to the sections 90 and 92 adjacent the fold 88 and are engaged over the fasteners 46 at the portion of frame 36 facing the opening O.

The free longitudinal edges of the sections 90 and 92 are folded and stitched to themselves to form casings 96 and 98 that receive retaining rods 100 and 102. The casing 98 and rod 102 extend transversely across and rest upon the strips 50 and the flap section 90 is folded back to extend through the opening O as shown in Figure 7.

Corner members 104 are removably engaged with and extend upwardly from the corners of the frame 36. The corner members 104 include relatively perpendicular triangular walls joined at their lower base ends by a flat wall 106 having pins 108 extending downwardly therefrom. The vertical flange 42 of frame 36, at the corners thereof, are provided with apertures 110 (Figure 8) through which the pins 108 extend to retain the corner members 104 relative to the frame 36.

Hooks 112 are secured in recesses 114 in the corner members 104 and will engage eyes 116 secured to the corners of the wall 14 (Figure 8) to retain the relatively perpendicular walls of the corners 104 against the relatively perpendicular surfaces of wall 14.

Apron 74 is engaged with the corner members 104 and in order that the apron will engage the corner members without requiring folding of the apron 74, the apron 74 is formed with cut-outs and darts 118 are secured in these cut-outs as shown in Figure 2.

Means is provided for heating the brooder. This means comprises a series of reversely bent heating coils or a reversely bent heating cable 120 which extends back and forth between the joists 28 (Figure 3). The upper edges of the joists 28 are notched, as at 122, to receive upper and lower insulating strips 124 and 126 which are secured to the joists 28 by fasteners 128. The lower strips 126 are formed with grooves 130 in their upper faces accommodating the cable 120 so that the cable will be secured between the strips 124 and 126, as shown in Figure 11. Cable 120 is suitably operatively connected to a thermostat T and a source of electric current so that the cable may be heated to a predetermined temperature.

In order that persons may walk back and forth on the floor 36, 50, 51, a plurality of parallel walk planks 130 extend transversely across the joists 28, as shown in Figure 3, under the frame 36 and are seated in notches in the upper edges of the joists to be flush with the upper edges of the joists. These walk planks underlie the overlapping longitudinal edges of adjacent flooring strips 50, 51 so that the location of these planks will be known by a person observing the said overlapping edges of the flooring strips 50, 51.

The flooring strips 50, 51 as aforedescribed, are composed of two layers 52 and 54 which are secured together by stitching or the like. The canvas layer 52 are each provided with a longitudinal edge that overhangs a longitudinal edge of the screen layers 54 to which it is secured. These overhanging strip portions 132 (Figures 16 and 17), are slit at their ends so that the strip portions 132 may be folded back when it is desired to permit litter to pass under the strips 50, 51. However, when the chicks are young, the strip portions 132 are folded outwardly (dotted lines in Figure 17) to retain litter on the flooring strips and the strips 50, 51 are arranged as shown in Figure 5 with the strips being stepped downwardly from the outer strips 51 to the two intermediate strips.

The strips 50, 51 are applied to the frame 36 so that adjacent strips will have overlapping longitudinal edges (Figure 4). One of the strips 51 is first applied to the frame 36, then its adjacent strip 50 and the strip 50 which overlaps the first placed strip 50. Next, the other strip 51 is applied, then its adjacent strip 50 and finally the remaining strip 50.

Litter on the strips 50, 51 is worked between the overlapping edges of adjacent strips and will drop into the base 12. Ventilators V are mounted in suitable openings in the base 12 so that the litter will be ventilated. Apron 74 and flap 86 prevent foul odors from passing upwardly past the frame 36.

What is claimed as new is as follows:

1. In a brooder including a peripheral wall, an open substantially rectangular frame, means removably securing said frame to said peripheral wall, a plurality of elongated flexible floor-forming strips terminally secured to said frame, adjacent strips having overlapping longitudinal edges, whereby droppings may be worked under adjacent strips, and a draft preventing apron having an upper marginal edge secured to said peripheral wall and a lower marginal edge overlying the strips.

2. In a brooder including a peripheral wall, an open substantially rectangular frame, means removably securing said frame to said peripheral wall, a plurality of elongated flexible floor-forming strips terminally secured to said frame, adjacent strips having overlapping longitudinal edges, whereby droppings may be worked under adjacent strips, and a draft preventing apron having an upper marginal edge secured to said peripheral wall and a lower marginal edge overlying the strips, said means removably securing said frame to said peripheral wall includes a plurality of headed fasteners having head portions spaced from said wall, said frame being of angle iron construction and including vertical flanges resting against said wall and having key slots accommodating said fasteners.

3. In a brooder including a peripheral wall, an open substantially rectangular frame, means removably securing said frame to said peripheral wall, a plurality of elongated flexible floor-forming strips terminally secured to said frame, adjacent strips having overlapping longitudinal edges, whereby droppings may be worked under adjacent strips, and a draft preventing apron having an upper marginal edge secured to said peripheral wall and a lower marginal edge overlying the strips, a plurality of parallel floor joists carried by said peripheral wall and underlying said strips, said joists extending transversely across all of said strips, and means carried by said strips engaging said joists to prevent shifting of the strips.

4. In a brooder including a peripheral wall, an open substantially rectangular frame, means removably securing said frame to said peripheral wall, a plurality of elongated flexible floor-forming strips terminally secured to said frame, adjacent strips having overlapping longitudinal edges, whereby droppings may be worked under adjacent strips, and a draft preventing apron having an upper marginal edge secured to said peripheral wall and a lower marginal edge overlying the strips, a plurality of parallel floor joists carried by said peripheral wall and underlying said strips, said joists extending transversely across all of said strips, and means carried by said strips engaging said joists to prevent shifting of the strips, and a plurality of channel-shaped retainer clips anchored to the underside of each strip engaged over the joists to restrict shifting of the strips on the joists.

5. In a brooder including a peripheral wall, an open substantially rectangular frame, means removably securing said frame to said peripheral wall, a plurality of elongated flexible floor-forming strips terminally secured to said frame, adjacent strips having overlapping longitudinal edges, whereby droppings may be worked under adjacent strips, a draft preventing apron having a lower marginal edge folded upon said strips, said apron having an upper marginal edge disposed above the frame, means removably securing the upper marginal edge of said apron to said peripheral wall, a snap fastener strip secured to said apron and a complemental snap fastener strip secured to said peripheral wall engaging the strip secured to said apron.

6. In a brooder including a peripheral wall, an open substantially rectangular frame, means removably securing said frame to said peripheral wall, a plurality of elongated flexible floor-forming strips terminally secured to said frame, adjacent strips having overlapping longitudinal edges, whereby droppings may be worked under adjacent strips, and a draft preventing apron having an upper marginal edge secured to said peripheral wall and a lower marginal edge overlying the strips, and corner members secured to said frame and engaged by said apron.

7. In a brooder including a peripheral wall, an open substantially rectangular frame, means removably securing said frame to said peripheral wall, a plurality of elongated flexible floor-forming strips terminally secured to said frame, adjacent strips having overlapping longitudinal edges, whereby droppings may be worked under adjacent strips, and a draft preventing apron having an upper marginal edge secured to said peripheral wall and a lower marginal edge overlying the strips, hollow corner member having flat lower walls resting on said frame, said frame having corner apertures, and pins extending downwardly from the lower walls of said corner members engaged in said apertures, said apron being engaged against said corner members.

8. In a brooder including a peripheral wall, an open substantially rectangular angle iron frame having a peripheral vertical flange engageable against said wall, headed fasteners secured to said peripheral wall and having their heads spaced from said peripheral wall, said vertical flange having key slots therein receiving the headed ends of said fasteners, a plurality of strips overlying the frame and including a pair of outer strips and a plurality of intermediate strips, means removably securing the ends of all strips to the ends of said frame, means removably securing the outer strips to the sides of said frame, adjacent strips having overlapping longitudinal edges, and a draft preventing apron removably secured to said peripheral wall above said frame and having a lower marginal edge folded onto said strips.

9. In a brooder structure including a substantially rectangular pit-forming base, a brooder house supported on said base and including a peripheral wall having an entrance opening, an open substantially rectangular frame removably secured to said peripheral wall above said base, a plurality of side by side strips removably secured to said frame, adjacent strips having overlapping longitudinal edges, a draft preventing apron secured to said peripheral wall above said frame and having a lower marginal edge folded over the strips, parallel joists supported on said base within said peripheral wall and underlying the frame, said joists extending transversely across all of said strips, means carried by said strips engaging said joists to restrict shifting of the strips relative to each other, and a draft preventing flap secured to one end of the frame and having a portion extending through the opening.

10. In a brooder structure including a substantially rectangular pit-forming base, a brooder house supported on said base and including a peripheral wall having an entrance opening, an open substantially rectangular frame removably secured to said periperal wall above said base, a plurality of side by side strips removably secured to said frame, adjacent strips having overlapping longitudinal edges, a draft preventing apron secured to said peripheral wall above said frame and having a lower marginal edge folded over the strips, parallel joists supported on said base within said peripheral wall and underlying the frame, said joists extending transversely across all of said strips, means carried by said strips engaging said joists to restrict shifting of the strips relative to each other, and a draft preventing flap secured to one end of the frame and having a portion extending through the opening, and a plurality of spaced parallel runways underlying said strips and disposed perpendicular to said joists, said runways being located under the overlapping edges of adjacent strips.

No references cited.